Dec. 3, 1940.  A. E. ROY  2,223,944

CHECK VALVE

Filed March 26, 1937

INVENTOR.
Albert E. Roy
BY Russell M. Otis

ATTORNEY.

Patented Dec. 3, 1940

2,223,944

UNITED STATES PATENT OFFICE 2,223,944

CHECK VALVE

Albert E. Roy, Los Angeles, Calif.

Application March 26, 1937, Serial No. 133,213

5 Claims. (Cl. 251—119)

This invention relates to a check valve, that is, the type of valve which permits fluid to flow in only one direction through the valve. I use the word fluid in its broad sense to include both liquid and gas, as the valve of my invention is equally adaptable to either.

It is an object of my invention to provide a check valve which seals tightly while subjected to a pressure difference in the closing direction.

Another object of the invention is to provide a check valve with a flexible sealing member and means to support the member from buckling or collapse when under a pressure difference in the closing direction.

Another object of the invention is to provide a check valve having a plurality of seats, all of which seats are effective when the valve is subjected to a pressure difference in the closing direction.

A further object of the invention is to provide a check valve providing means for loading the sealing member in either direction.

Still another object of my invention is to provide a check valve which is simple and cheap to manufacture.

These and other objects which will be apparent, I attain in a manner which will be clear from a consideration of the following description taken in connection with the accompanying drawing, of which:

Figure 1:
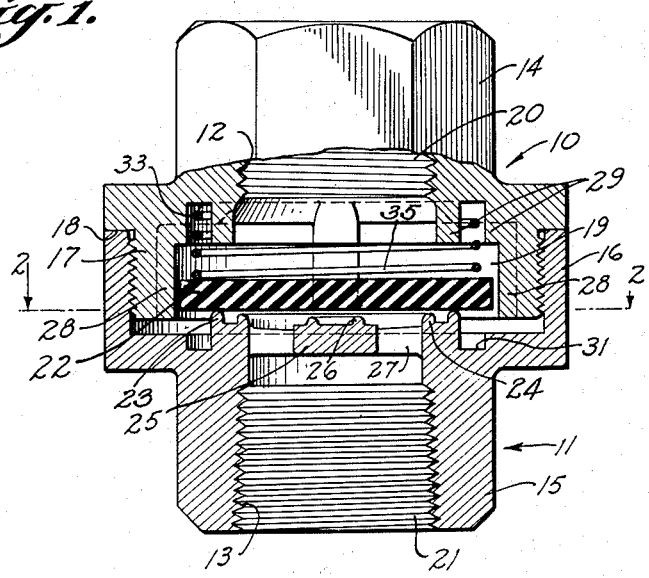
Fig. 1 is a partial diametral cross-sectional view of my check valve, the section being taken in the plane 1—1 of Fig. 2, the valve being shown in a condition corresponding to that of absence of pressure difference across the valve, the sealing disc being undeflected.

In the preferred form of my check valve, I employ a body consisting of two members 10 and 11. The two members are each threaded internally in their end portions at 12 and 13, respectively, to receive correspondingly threaded male members which are part of the fluid line in which the valve is to be connected. The exteriors of the end portions of the members 10 and 11 are at 14 and 15, respectively, formed in hexagonal shape for engagement by a wrench. The member 11 has an enlarged cylindrical portion 16 threaded internally to receive a similar cylindrical portion 17 on the member 10 which is correspondingly threaded on its exterior. When the two halves of the valve are joined in operative connection the end of portion 16 abuts against the shoulder 18 on member 10 and forms a tight seal which effectively prevents leakage of fluid therethrough.

When the members 10 and 11 are joined in operative connection, as shown, they form a chamber 19 within, which connects with the fluid passage 20 through the member 10 and with the fluid passage 21 through the member 11. Within this chamber are located the valve seats and the sealing member.

I have found that, in a check valve, if both the valve seat and its engaging sealing member are inflexible, as when made of metal, the valve soon becomes leaky. This may come about by the surfaces of seat or sealing member becoming rough or by warping of the valve due to exposure to high temperatures or other influences. I overcome all these difficulties by use of a flexible disc as a sealing member and by the special seat construction which is hereinafter described. By using a flexible disc as a sealing member, any warping or changing of shape of the valve seat has no effect upon the sealing of the valve because the sealing member can readily flex to accommodate such a change.

In the drawing, the flexible sealing member is designated by the reference numeral 22. This sealing member is in the shape of a flat circular disc, and may be composed of rubber, chloroprene, leather, fabric, etc. or may be constituted of laminations of these or similar materials. The essential characteristic of this sealing member is that it is flexible. Preferably, I form the disc 22 of a material which is sufficiently soft that it will deflect enough to seal over minute roughnesses on the valve seat.

Figure 3:
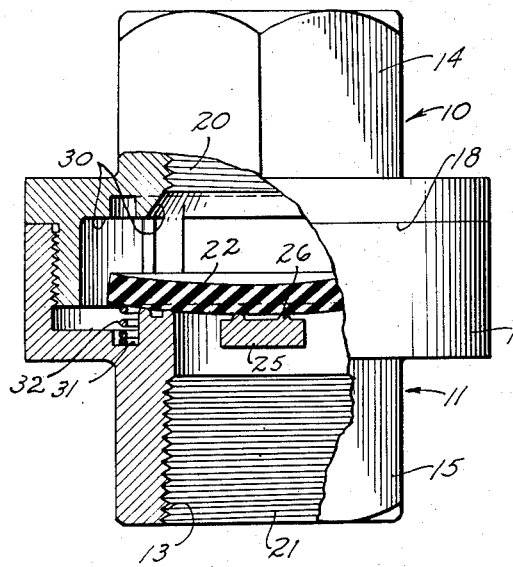
Fig. 3 is a partial sectional view of my check valve, the section being taken along the plane 3—3 of Fig. 2. In this view a spring is inserted under the sealing disc and the disc is shown deflected as in the case of a pressure difference across the valve in a closing direction.
Figure 2:
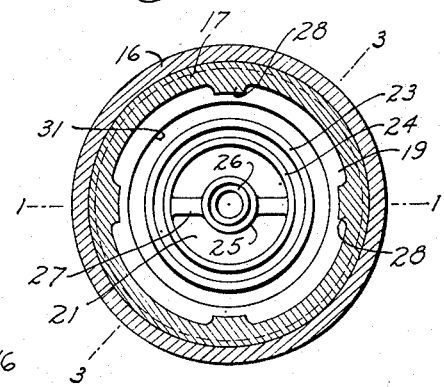
Fig. 2 is a sectional view of my check valve taken in the plane 2—2 of Fig. 1.

I provide against small specks of dirt, sand, fibre, and the like, getting between the valve seat and the sealing member and causing leaks, by providing a plurality of valve seats for the sealing member to engage in sealing contact. In the drawing, I have illustrated the valve with two such seats 23 and 24, but it is understood that I may employ more than two, if desired. Since in the sealing position of the sealing member 22 on the seats, that is, in the closed position of the valve, the pressure of fluid in passage 20 is greater than that in passage 21, the flexible disc is deflected by this pressure difference into the shape shown in Fig. 3. An important feature of my invention is that the inner valve seat 24 is at a lower elevation than the seat 23, so that when the flexible disc is deflected by the pressure difference existing on its two sides when in the sealing position, the disc engages both seats and provides double insurance against leaks. It will be seen that if two seats at the same elevation were employed with a flexible disc sealing member, when a pressure difference exerts itself on the disc in the sealing position the disc would deflect and the inner seat would act as a fulcrum for the disc, resulting in the lifting of the disc off the outer seat so as to destroy the effectiveness of two seats. By placing the inner seat at a lower elevation than the outer seat I secure the advantages attendant upon both the flexible sealing member and the plurality of seats. If it is desired to use more than two seats, they are arranged at progressively lower elevations from the outermost to the innermost to correspond roughly with the shape of the pressure deflected disc.

To restrict the deflection of the disc to that which will result in it engaging both the seats 23 and 24, I provide a central concentric support 25 which in this instance is shown as contacting the disc 22 through the ring 26 whose contacting surface is located at a lower elevation than either seat 23 or 24. This support may simply be a circular button with a flat upper surface if desired. It is important, however, that the support for the disc be concentric with the valve seats and be circular in shape, in order not to warp the disc out of contact with the seats. The support 25 is rigidly carried by the member 11 through the diametrally extending arms 27 whose upper surfaces are at so low an elevation that it is impossible for the disc to contact them. Around the arms 27 and the support 25 is ample area through which fluid may flow to or from the passage 21.

The disc 22 is guided in its movement within the chamber 19 by ribs 28 which are spaced circumferentially around and project inwardly from the cylindrical portion 17 of member 10. Between the ribs 28 there is ample room for fluid to pass around the sealing disc 22. The ribs 28 are at their upper ends continuous with radially directed ribs 29 which project downwardly from the upper wall of the chamber 19. The ribs 29 provide a stop for the disc 22 in its upward movement and keep it far enough from the upper wall 30 of the chamber 19 to permit fluid to flow between the disc and the wall in its passage through the valve.

In the most common use of the valve, the sealing disc 22 is moved into contact with and away from the valve seats simply by fluid pressure. When the fluid pressure is greater in the passage 20 than in the passage 21 fluid tends to pass through the valve toward passage 21. The impact of fluid on the upstream side of the disc 22 tends to force it to the closed or sealing position and this action is assisted by the reduced pressure corresponding to the increased velocity of fluid as it passes through the closing gap between the disc and the valve seats. When the disc actually engages the seats it is held in the sealing position by the greater pressure on its upstream surface and the flow of fluid ceases. When the pressure in the passage 21 exceeds that in passage 20, the fluid simply forces the disc off its seats into the open position, where it resides against the ribs 29, and fluid can pass through the valve toward passage 20.

Occasionally it is desirable to have the valve close only when the pressure in passage 20 exceeds that in passage 21 by a definite amount. To accomplish this I provide an annular groove 31 in member 11 under the disc 22 and place in this groove a coil spring 32 bearing at one end on the bottom of the groove and at the other end on the under face of the sealing disc. Thus the spring continually urges the disc upwardly and requires that a difference in pressure in the two passages exist which shall be sufficient to overcome the compression of this spring before the valve will close.

Occasionally, also, it is desired to have a valve which will only open when the fluid pressure in passage 21 exceeds that in passage 20 by a certain amount. I, therefore, provide an annular groove 33 in the member 10 above the disc 22 for retaining a coil spring similar to that designated by the numeral 32, which spring 35 can bear at one end on the bottom of the groove 33 and at the other end on the top of disc 22 to urge the disc toward the valve seats. Thus it will be seen that my check valve may be adapted to function under any desired pressure conditions.

It is understood that various changes and modifications in design and construction may be made by those skilled in the art without departing from the spirit of the invention as defined in the appended claims.

I claim:

1. In a check valve, in combination, a plurality of coaxial valve seats arranged at progressively lower elevations from the outermost to the innermost, a flexible sealing member, and a support coaxial with said seats but at a lower elevation, all in such manner that the flexible sealing member engages said seats in the closed position of the valve and when deflected by the closing pressure and is restricted in its deflection by said support.

2. A check valve comprising a valve body including a chamber within and a fluid passage therethrough, two coaxial valve seats on said valve body and surrounding said passage, the inner one of said valve seats being at a lower elevation than the outer one, a flexible sealing disc adapted to engage said seats in the closed position of said valve and when deflected by the closing pressure, and a support coaxial with but at a lower elevation than said seats and being adapted to restrict the deflection of the flexible sealing disc in the closing direction.

3. A check valve as defined in claim 2 which includes spring means for normally holding said sealing disc out of engagement with said seats.

4. In a check valve, in combination, a plurality of coaxial valve seats arranged at progressively lower elevations from the outermost to the innermost, a bodily movable flexible sealing member, and a support coaxial with said seats but at a lower elevation, all in such manner that the flexible sealing member engages said seats in the closed position of the valve and when deflected by the closing pressure and is restricted in its deflection by said support.

5. A check valve as defined in claim 2 which includes spring means for normally urging said sealing disc towards said seats.

ALBERT E. ROY.